US006581909B2

(12) United States Patent
Wixey

(10) Patent No.: US 6,581,909 B2
(45) Date of Patent: Jun. 24, 2003

(54) SIMPLIFIED HYDRAULIC CIRCUIT FOR A QUICK-RISE HYDRAULIC LIFTING JACK

(75) Inventor: Matthew A. Wixey, Jonesboro, AR (US)

(73) Assignee: Clore Automotive, LLC, Lenexa, KS (US)

(*) Notice: Subject to any disclaimer, the term of this patent is extended or adjusted under 35 U.S.C. 154(b) by 0 days.

(21) Appl. No.: 09/887,699

(22) Filed: Oct. 4, 2001

(65) Prior Publication Data

US 2002/0153514 A1 Oct. 24, 2002

Related U.S. Application Data

(63) Continuation of application No. 09/431,428, filed on Nov. 1, 1999, now abandoned.

(51) Int. Cl.[7] .................................................. B60P 1/48

(52) U.S. Cl. ....................... 254/8 B; 254/2 B; 254/2 C; 254/8 C

(58) Field of Search ................................. 254/8 B, 8 C, 254/2 B, 2 C, 9 B, 9 C, 10 B, 10 C

(56) References Cited

U.S. PATENT DOCUMENTS

| | | | |
|---|---|---|---|
| 4,018,421 | A | 4/1977 | Tallman |
| 4,131,263 | A | 12/1978 | John |
| 4,436,114 | A | 3/1984 | Kotter |
| 4,557,180 | A | 12/1985 | Glomeau |
| 4,748,896 | A | 6/1988 | Ott et al. |
| 4,917,001 | A | 4/1990 | Yoshikawa et al. |
| 5,640,892 | A | 6/1997 | Kauss |
| 5,755,099 | A | 5/1998 | Hung |
| 5,947,447 | A | 9/1999 | Sorensen |
| 6,035,635 | A | 3/2000 | Hung |

*Primary Examiner*—Joseph J. Hail, III
*Assistant Examiner*—Daniel Shanley
(74) *Attorney, Agent, or Firm*—Bryan Cave, LLP

(57) ABSTRACT

A hydraulic fluid circuit for a quick rise type lifting jack positions multiple valves that control two stages of the lifting operation of the jack in the same valve housing machined into a base of the jack and thereby reduces the costs involved in manufacturing and assembling the hydraulic circuit of the jack.

20 Claims, 5 Drawing Sheets

SIMPLIFIED HYDRAULIC CIRCUIT FOR A QUICK-RISE HYDRAULIC LIFTING JACK

RELATED APPLICATION DATA

This application is a continuation of application Ser. No. 09/431,428, filed Nov. 1, 1999, now abandoned.

BACKGROUND OF THE INVENTION (1) Field of the Invention

The present invention pertains to hydraulic lifting jacks and, in particular, a simplified hydraulic circuit for a quick-rise type lifting jack. The novel construction of the hydraulic circuit positions two discharge valves that control two stages of the lifting operation of the jack in the same valve housing in a base of the jack and thereby significantly reduces the costs involved in manufacturing and assembling the hydraulic circuit of the jack.

(2) Description of the Related Art

FIG. 1 shows a typical hydraulic jack commonly referred to as a service jack. Hydraulic jacks of this type are well known in the art and examples of the constructions of such jacks are shown in the Tallman U.S. Pat. No. 4,018,421, issued Apr. 19, 1997, and the John U.S. Pat. No. 4,131,263, issued Dec. 26, 1978. Generally, hydraulic jacks of the type shown in FIG. 1 are operated by manually oscillating the lever arm 12 of the jack upwardly and downwardly. The oscillating movement of the lever arm 12 is transferred to a reciprocating pump 14 that draws hydraulic fluid from a reservoir of the jack and compresses the fluid. The compressed fluid unseats a discharge valve of the jack hydraulic circuit causing the pressurized hydraulic fluid to travel through the hydraulic circuitry machined in a base 16 of the jack. The hydraulic circuitry routes the pressurized hydraulic fluid to a lifting cylinder where the pressurized hydraulic fluid acts on a ram or lifting piston of the jack. Extension of the ram or lifting piston of the jack from the cylinder while being acted on by hydraulic fluid under pressure pumped from the pump 14 causes a lifting arm 18 to rise through a mechanical connection between the lifting piston and the arm. In many hydraulic jacks of the type shown in FIG. 1, the lever arm 12 is rotatable in its connection to the jack. Rotation of the arm 12 in a counter-clockwise direction opens a release valve that allows the pressurized hydraulic fluid in the lifting cylinder of the jack to be vented back to the hydraulic fluid reservoir, thereby allowing the lifting arm 18 to be lowered. Rotating the lever arm 12 counter-clockwise after the lifting arm 18 has been lowered reseats the release valve and the jack is again ready for its lifting operation.

There are many different types of hydraulic fluid jacks of the type shown in FIG. 1. In addition, there are similar types of jacks commonly referred to as bottle jacks due to their appearance. These jacks do not employ a lifting arm 18 that raises as the ram or lifting piston is extended from the lifting cylinder of the jack, but instead employ the ram or lifting piston as the lifting component of the jack. Operation of the lever arm of a bottle jack causes the ram or lifting piston to be extended vertically from the lifting cylinder and thus the lifting force of the lifting piston is applied directly to the object to be raised and not through a mechanical linkage such as the lifting arm 18 of the jack of FIG. 1.

All jacks of the type described above employ a circuit of conduits and valves to control the delivery of hydraulic fluid pressurized by the pump of the jack to the lifting cylinder of the jack. The hydraulic conduits and valve housings are commonly constructed by machining or drilling holes into a cast solid metal base of the jack. The conduits and valve housings are then sealed closed at the exterior of the base by screw threaded plugs or set screws that are screwed into internal screw threading of the conduits and valve housings adjacent the exterior of the base. More simplified hydraulic jack constructions require only a few conduits and valve housings machined into the base of the jack and therefore the machining costs of the more simplified hydraulic jacks are relatively small when compared to other jack constructions.

More complex jack constructions, for example, a hydraulic jack that has a quick-rise feature where the ram or lifting piston is extended quickly from the lifting cylinder on oscillation of the jack lever arm until it encounters a resisting load, and then is extended more slowly from the lifting cylinder as the hydraulic fluid is pressurized by the lever arm and pump to lift the load require a more elaborate hydraulic circuit in the jack base. The more elaborate circuit of a quick-rise lifting jack requires additional conduits to be machined into the base of the jack and additional valve housings to control the two stage lifting function of the jack. Jacks of this type will have increased manufacturing costs over that of more simplified jacks due to the additional machining steps needed to construct the hydraulic circuit and the additional assembly steps needed to assemble the valve elements into the valve housings of the hydraulic circuit.

FIG. 2 shows a schematic representation of a hydraulic circuit for a prior art quick-rise lifting jack. The circuit is formed into the base (not shown) of the jack in the known manner of machining conduits and valve housings into the base from the exterior of the base. All hydraulic circuits of this type basically operate by drawing hydraulic fluid from a fluid reservoir into a pump, and then pressurizing the fluid forcing it through the hydraulic circuit to the lifting cylinder where the pressurized fluid causes a ram or piston to be extended from the cylinder. As explained earlier, the lifting piston is mechanically connected to a lifting arm of the jack or acts directly on the load being lifted by the jack. In operation of the circuit shown in FIG. 2, the lifting piston is quickly extended out of the lifting cylinder until it encounters the load to be raised. On subsequent operation of the pump of the hydraulic circuit, the lifting cylinder is raised at a slower rate but exerts a greater force on the object to be raised.

The hydraulic circuit shown in FIG. 2 includes a pump 22 comprised of a pump cylinder 24 and a pump plunger 26 mounted in the cylinder for reciprocating movement therein. The reciprocating movement of the pump plunger 26 is caused by oscillating movements of the arm 12 shown in FIG. 1.

The pump cylinder 24 communicates through a conduit 32 with a relief valve 34. The relief valve 34 includes a cavity machined into the base (not shown) of the jack that contains a relief ball valve 36 that is held against a valve seat by a spring 38. The cavity is sealed closed by a screw threaded plug 42. The cavity also communicates with the hydraulic fluid reservoir R of the jack through a conduit 44 that is behind the relief ball valve 36 when the ball valve is positioned on its valve seat as shown in FIG. 2.

The pump cylinder 24 also communicates through a conduit 46 with a discharge valve 48. The discharge valve 48 includes a discharge ball valve 52 that is biased against a valve seat by a spring 54 that is contained in a cavity machined into the jack base. The cavity is closed by a screw threaded plug 56. At the bottom of the discharge valve cavity is a suction valve cavity containing a pump suction ball valve 58 that seats on a valve seat separating the suction valve cavity, the pump cylinder 24 and the conduit 46 communicating the pump cylinder with the discharge valve cavity and suction valve cavity from the reservoir R.

A further length of conduit 62 extends downstream from the discharge valve 48. This length of conduit 62 communicates with the release valve 64, a gravity valve 66, a second stage ball valve 68 and an interior ram 72 of the jack lifting mechanism 74.

The release valve 64 contains a release valve element 76 that is shown in FIG. 2 seated against a valve seat that is machined into the base. The release valve element 74 is permitted to move away from the valve seat when the lever arm 12 of the jack is rotated in a counter-clockwise direction as explained earlier. This unscrews the release valve element 74 away from its valve seat and opens communication of the downstream conduit 62 to the hydraulic fluid reservoir R. Rotation of the lever arm 12 in the clockwise direction causes the release valve element 74 to be screw threaded into the downstream conduit 62 closing the valve against its valve seat.

The gravity valve 66 includes a gravity ball 78 that seats on a valve seat machined into the base. The gravity ball 78 is not spring biased against the seat. When the release valve 64 is opened, a difference in hydraulic fluid pressure on opposite sides of the gravity ball 78 causes the ball to unseat from its valve seat, opening communication through the gravity valve 66 to the release valve 64 in a manner that will be later explained.

The second stage valve 68 comprises a ball valve 82 that is biased by a spring 84 against a valve seat machined into the base of the jack. As explained earlier, the cavity that contains the second stage ball valve 82 and its spring 84 is machined into the base by drilling the cavity from the exterior of the base. The second stage ball valve 82 controls communication of fluid between the downstream conduit 62 and the interior of a lifting cylinder of the lifting mechanism 74 to be described.

The interior ram 72 is a long hollow tube that is mounted in the base of the jack. The interior 86 of the ram 72 communicates with the downstream conduit 62 through a ram conduit 88 machined into the base.

The lifting mechanism 74 of the jack includes a lifting cylinder 92 secured to the base of the jack. The tubular interior ram 72 extends through the center of and is coaxial with the lifting cylinder 92. An outer ram or lifting piston 94 is mounted in the lifting cylinder 92 over the interior ram 72. The lifting piston 94 has a cylindrical interior bore 96 into which the interior ram 72 extends. A seal 98 in the interior bore 96 of the lifting piston seals around the exterior of the interior ram 72 and defines a first chamber in the interior bore 96 of the lifting piston. An interior surface 102 of the lifting piston 94 in the first chamber of the interior bore 96 functions as a first stage reaction surface or lifting surface of the lifting mechanism as will be explained.

The lifting piston 94 has a cylindrical exterior surface and an annular seal 106 extends around the exterior surface and engages in sliding, sealing contact with the interior of the lifting cylinder 92. The seal 106 also defines a second chamber 108 in the lifting cylinder 92. Inside the second chamber 108 is a second surface 112 or second stage reactive or lifting surface of the lifting piston 94.

Communicating with the second chamber 108 of the lifting cylinder 92 is a suction valve 114. The suction valve 114 is comprised of a suction ball valve 116 and a spring 118 that biases the suction ball valve against a valve seat machined into the base. When a vacuum is created in the second chamber 108, the suction ball valve 116 is pulled against the bias of the spring 118 and unseats from its valve seat communicating the second chamber 108 with the hydraulic fluid reservoir R of the jack. Also communicating with the second chamber 108 of the lifting cylinder 92 is the gravity valve 66 and the second stage valve 68.

In operating the hydraulic circuit of the two stage lifting jack shown in FIG. 2, the lever arm 12 of the jack is first manually oscillated causing the plunger 26 to be retracted in the pump cylinder 24. This creates a vacuum in the pump cylinder that unseats the pump suction valve 58 and causes hydraulic fluid to be drawn from the reservoir R into the pump cylinder. On subsequent movement of the plunger 26 back into the cylinder 24 while manually oscillating the lever arm 12, the fluid in the pump cylinder is pressurized. If the pressure of the fluid in the pump cylinder 24 becomes excessive, the relief ball valve 36 will unseat from its seat against the bias of its spring 38 and allow the fluid under pressure in the pump cylinder 24 to pass through the relief valve 34 and return to the jack reservoir R. In normal operation of the jack, the fluid under pressure in the pump cylinder 24 travels through the conduit 46 communicating the cylinder with the discharge valve 48. The pressure of the fluid causes the discharge ball valve 52 to be displaced from its valve seat against the bias of its spring 54. This allows the fluid under pressure to pass into the downstream conduit 62.

The fluid in the downstream conduit 62 is directed to the release valve 64, the gravity valve 66, the second stage valve 68 and into the ram conduit 88 and the interior bore 86 of the interior ram 72. The force exerted by the second stage spring 84 on the second stage ball valve 82 is much greater than that of the discharge valve spring 54 on the discharge ball valve 52 and therefore the second stage ball valve does not open. With no load applied on the lifting piston 94 of the jack, fluid pressure builds up quickly in the first chamber defined by the interior bore 96 of the piston and acts against the first reaction surface 102 of the piston. This causes the piston 94 to be extended quickly from the lifting cylinder 92. As the piston is extended from the cylinder, a vacuum is created in the second chamber 108 of the lifting cylinder. This vacuum causes the suction valve ball 116 to unseat from its valve seat against the bias of its spring 118 and draws hydraulic fluid from the reservoir into the second chamber 108 behind the annular seal 106 of the lifting piston. The quick extension of the lifting piston 94 is continued in this manner by continued manual oscillating movement of the jack lever arm 12.

Once the lifting piston 94 reaches the object to be raised and a load is exerted on the piston, the force of hydraulic fluid pressure in the first chamber 96 defined by the piston interior bore acting on the first reaction surface 102 of the piston will eventually become insufficient to further extend the piston from the lifting cylinder 92 and lift the object. This causes the hydraulic fluid pressure in the downstream conduit 62 and in the ram conduit 88 to increase, eventually to the point that it displaces the second stage ball valve 82 from its valve seat against the bias of the second stage spring 84. This allows the hydraulic fluid to then pass through the second stage valve 68 and enter the second chamber 108 of the lifting mechanism. The increased pressure of the hydraulic fluid in the second chamber 108 acts against the larger surface area of the second reaction surface 112 of the piston 94. This results in a greater force exerted on the lifting piston 94 by the hydraulic fluid and the further extension of the lifting piston out of the cylinder, although now at a decreased rate.

Once the object has been lifted by the jack and it is desired to lower the object and retract the lifting piston 94 back into the lifting cylinder 92, the release valve 64 is opened by rotating the lever arm 12 of the jack in a counter-clockwise direction. This causes the release valve element 76 to be rotated in its internally threaded bore and to back away from its valve seat, opening communication between the downstream conduit 62 and the fluid reservoir R. This relieves the fluid pressure in the downstream conduit 62 and the fluid in the first chamber 96 defined by the piston interior bore is forced through the interior 86 of the first stage ram 72, through the ram conduit 88 and the downstream conduit 62 bypassing the release valve 64 to the reservoir R. With the fluid pressure in the downstream conduit 62 being relieved, the fluid under pressure in the second chamber 108 displaces the gravity ball 78 of the gravity valve 66 and flows past the release valve 64 to the reservoir R. In this manner, the lifting piston 94 is retracted back into the lifting cylinder 92 of the jack.

From the description of the prior art two stage lifting jack hydraulic circuit described above, although with reference to a simplified schematic representation of the circuit, it should be appreciated that a complex hydraulic circuit of the type shown in FIG. 2 requires a significant number of machining operations at several different locations in the base of the lifting jack to form the hydraulic fluid conduits and the valve housings of the circuit. The number of machining steps required to drill holes into the base of the jack and the number of different locations of the holes in the base of the jack required to produce a complex hydraulic circuit such as that described above with reference to FIG. 2 significantly contributes to the overall costs involved in manufacturing a two stage lifting hydraulic jack. If the manufacturing process could be simplified by reducing the number of conduits and/or valve housings required for a hydraulic circuit and thereby reducing the number of machining steps and the number of different locations on the base where machining steps are to be performed would significantly reduce the costs of manufacturing two stage lifting jacks of the type shown in FIG. 2 and described above.

SUMMARY OF THE INVENTION

The hydraulic circuit of the present invention overcomes disadvantages of prior art hydraulic circuits of the type employed in two stage lifting jacks by the design of the circuit which positions several valve elements coaxially in line with each other. The simplified hydraulic circuit of the invention positions three valve elements in the same valve housing where cavities in the valve housing containing each of the valve elements are extensions of each other. The coaxial alignment of the three valve elements and their associated three valve cavities enables the three cavities of the valve housing to be formed in a single bore machined into the base of the jack, thus eliminating additional manufacturing steps required in machining three separate valve housing cavities in three separate locations on the exterior of the base of the jack. In this manner, the simplified design of the hydraulic circuit of the lifting jack of the invention significantly reduces manufacturing costs of the jack.

BRIEF DESCRIPTION OF THE DRAWINGS

Further objects and features of the invention are set forth in the following detailed description of the preferred embodiment of the invention and in the drawing figures, wherein.

DESCRIPTION OF THE PREFERRED EMBODIMENT

Figure 1:
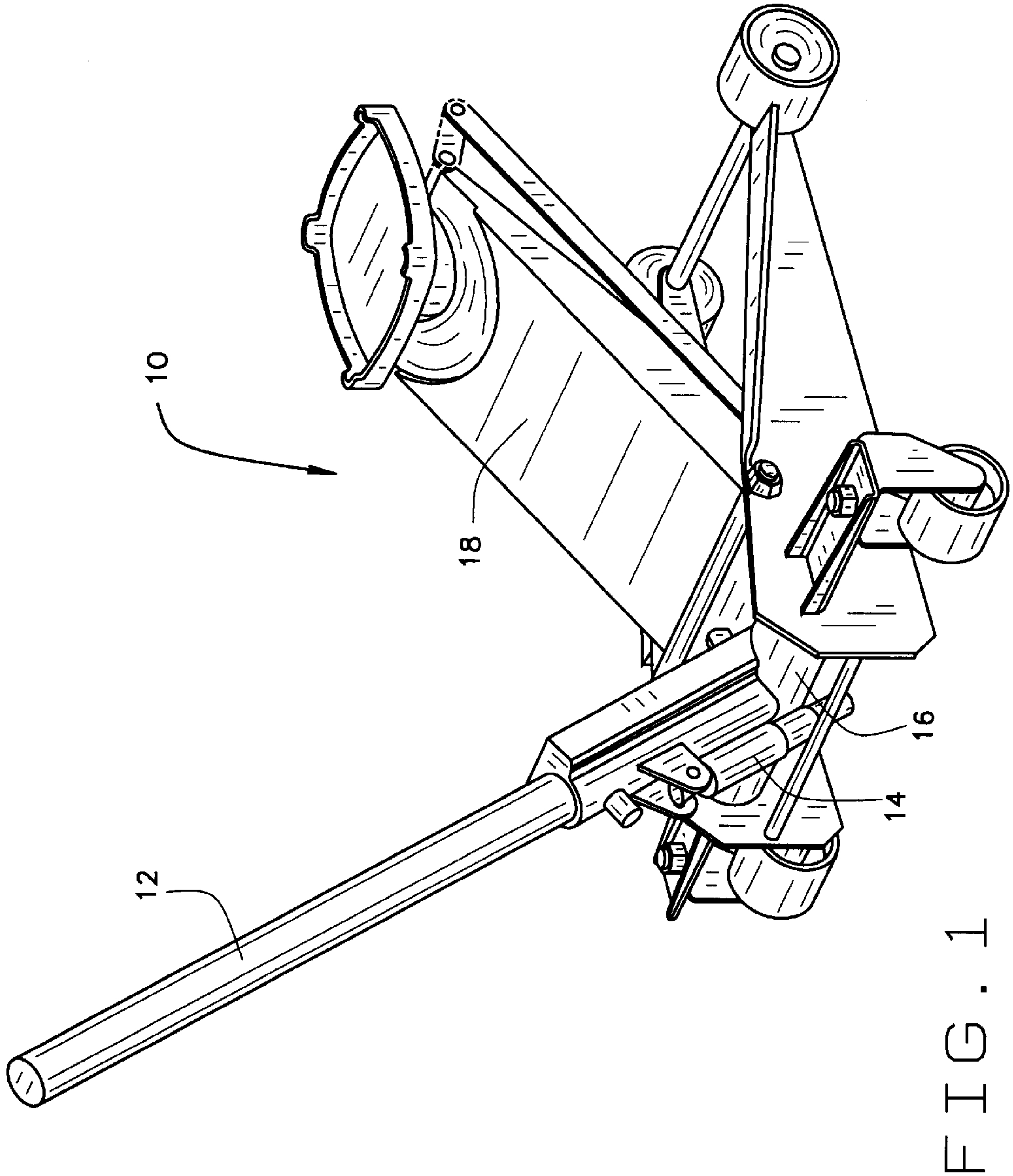
FIG. 1 is a perspective view of one type of lifting jack with which the simplified hydraulic circuit of the invention may be employed.
Figure 2:
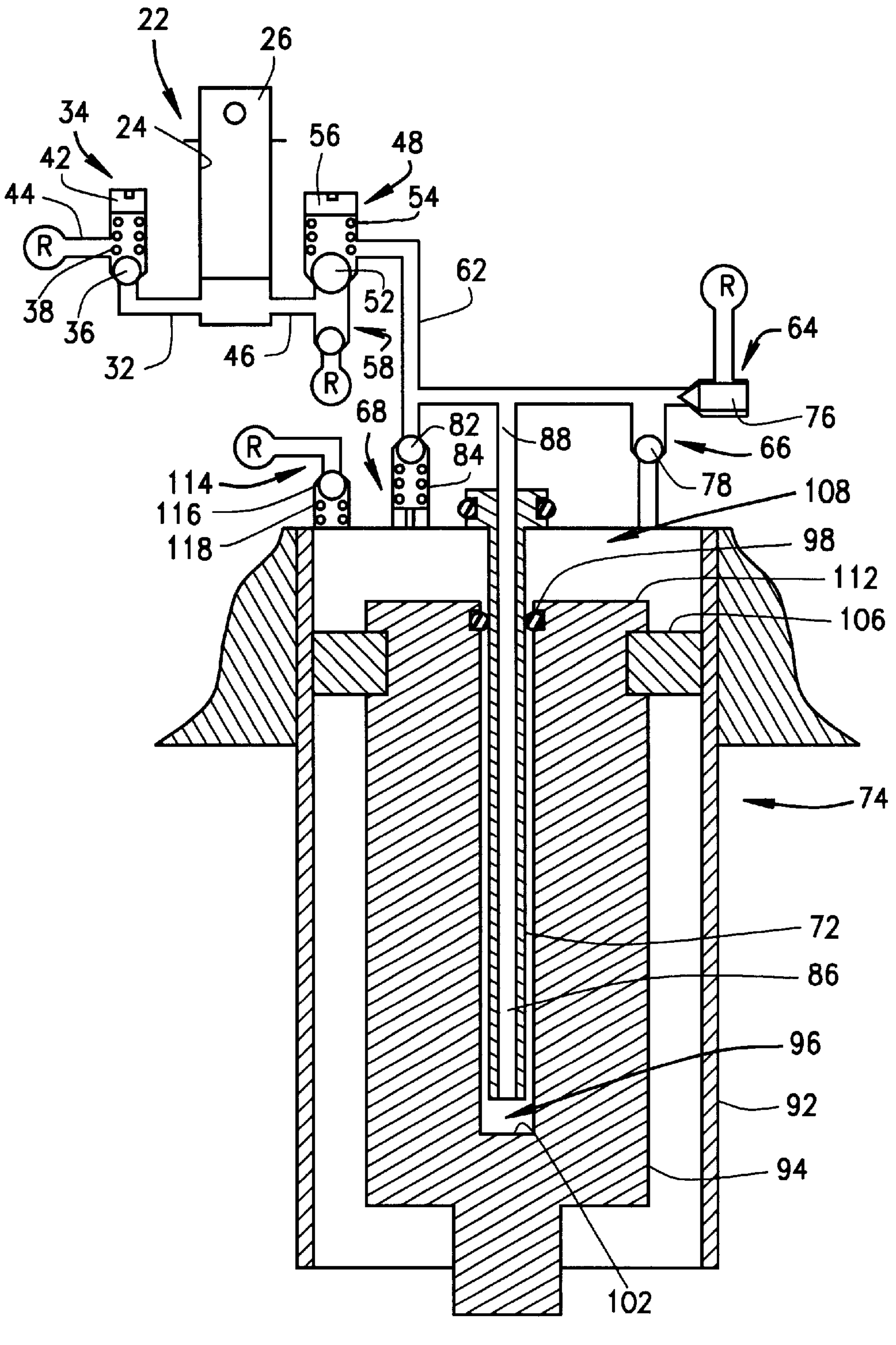
FIG. 2 is a schematic representation of a hydraulic circuit for a two stage, quick rising hydraulic jack.
Figure 3:
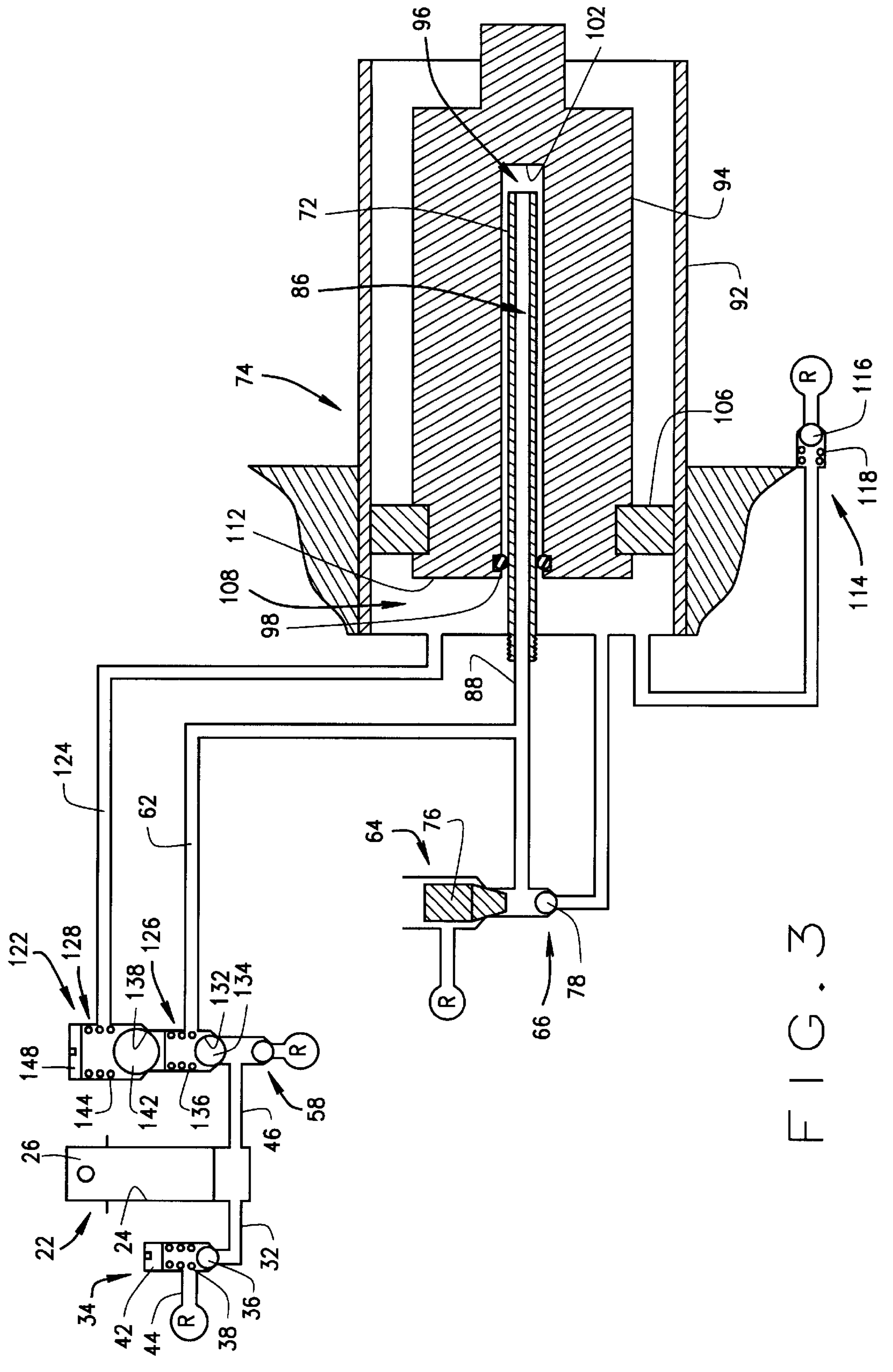
FIG. 3 is a schematic representation of the simplified hydraulic circuit of the invention employed in a two stage, quick rising jack.

The hydraulic circuit of the invention functions in basically the same manner as the prior art two stage hydraulic circuit of FIG. 2 and many component parts of the circuit of the invention shown in FIG. 3 are given the same reference numerals as the like component parts shown in FIG. 2. Basically, the improvement over the prior art two stage hydraulic circuit of FIG. 2 provided by the circuit of the invention shown in FIG. 3 is in a multiple valve element valve housing 122 that replaces both the discharge valve 48 and second stage valve 68 of the prior art circuit of FIG. 2. As in the prior art, the conduits and valve housing cavities shown in the schematic representation of the hydraulic circuit of the invention in FIG. 3 are machined into a base of the jack by drilling holes into the base from the exterior of the base. The multi-element valve housing 122 of the invention permits several valve elements to be positioned into coaxially aligned cavities machined into the base, thus eliminating separate cavities machined into the base for each of the valve elements of the prior art hydraulic circuit, eliminating machining steps required by the prior art circuit and reducing manufacturing costs from that of the prior art circuit.

The hydraulic circuit shown in FIG. 3 includes a pump 22, a relief valve 34, a pump suction valve 58, a downstream conduit 62, a release valve 64, a gravity valve 66, a lifting mechanism 74 and a lifting mechanism suction valve 114 that are the same in construction and operation to the like component parts of the hydraulic circuit shown in FIG. 2 and having the same corresponding reference numbers. However, in the hydraulic circuit of FIG. 3, the second stage valve 68 is absent and an additional fluid conduit 124 provides communication between the second chamber 108 of the lifting mechanism 74 and the multi-element valve housing 122 of the invention.

The valve housing 122 is machined into the base coaxially aligned with the pump suction valve 58. The valve housing is formed with a first cavity 126 and a second cavity 128. The first cavity 126 is an extension of the cavity of the pump suction valve 58 and communicates with the pump cylinder 24 through the first conduit 46. The first cavity 126 is drilled into the material of the base in line with the cavity of the pump suction valve 58 and with a larger circular cross-sectional area than that of the cavity of the pump suction valve 58. This forms an annular valve seat 132 at the bottom of the first cavity. The valve seat 132 separates the first cavity 126 from the cavity of the pump suction valve 58 and from the first conduit 46 communicating the pump suction valve with the pump. Positioned inside the first cavity 126 is a first stage ball valve element 134 and a first spring 136 biasing the valve element against the first cavity seat 132. The first cavity 126 communicates with the downstream conduit 62 behind the first stage valve element 134. When the first stage valve element is displaced from its valve seat

132, fluid communication is established between the pump 22, the first conduit 46, the first cavity 126 and the downstream conduit 62.

The second cavity 128 of the multi-element valve housing 122 is also machined into the base by drilling the cavity into the base coaxially with the first cavity 126 and the cavity of the pump suction valve 58. The second cavity 128 is formed with a slightly larger circular cross-sectional area than that of the first cavity 126, thus forming a second cavity valve seat 138 between the first cavity 126 and the second cavity 128. A second stage ball valve element 142 is positioned in the second cavity 128 on the valve seat 138, and a second spring 144 is positioned in the second cavity on the second ball valve. The opening of the second cavity 128 to the exterior of the base is machined with internal screw threading into which a high pressure plug 148 is screw threaded sealing closed the cavities.

The additional second stage conduit 124 communicates with the second cavity 128 behind the second ball valve element 142. This additional or third conduit 124 extends from the multi-element valve housing 122 to the second chamber 108 of the base.

Figure 4:
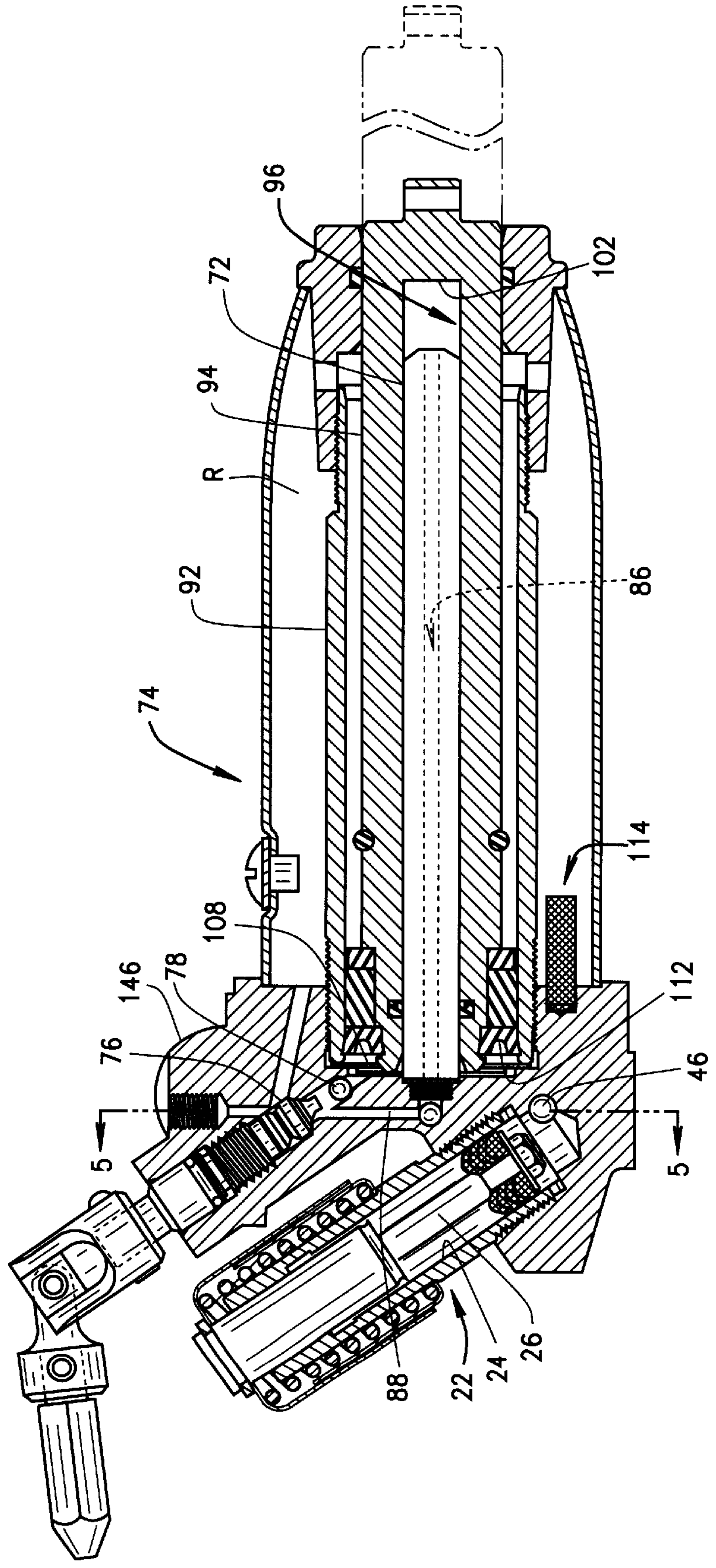
FIG. 4 is a cross-section view of a portion of a jack of the type shown in FIG. 1 employing the simplified hydraulic circuit of the invention.
Figure 5:
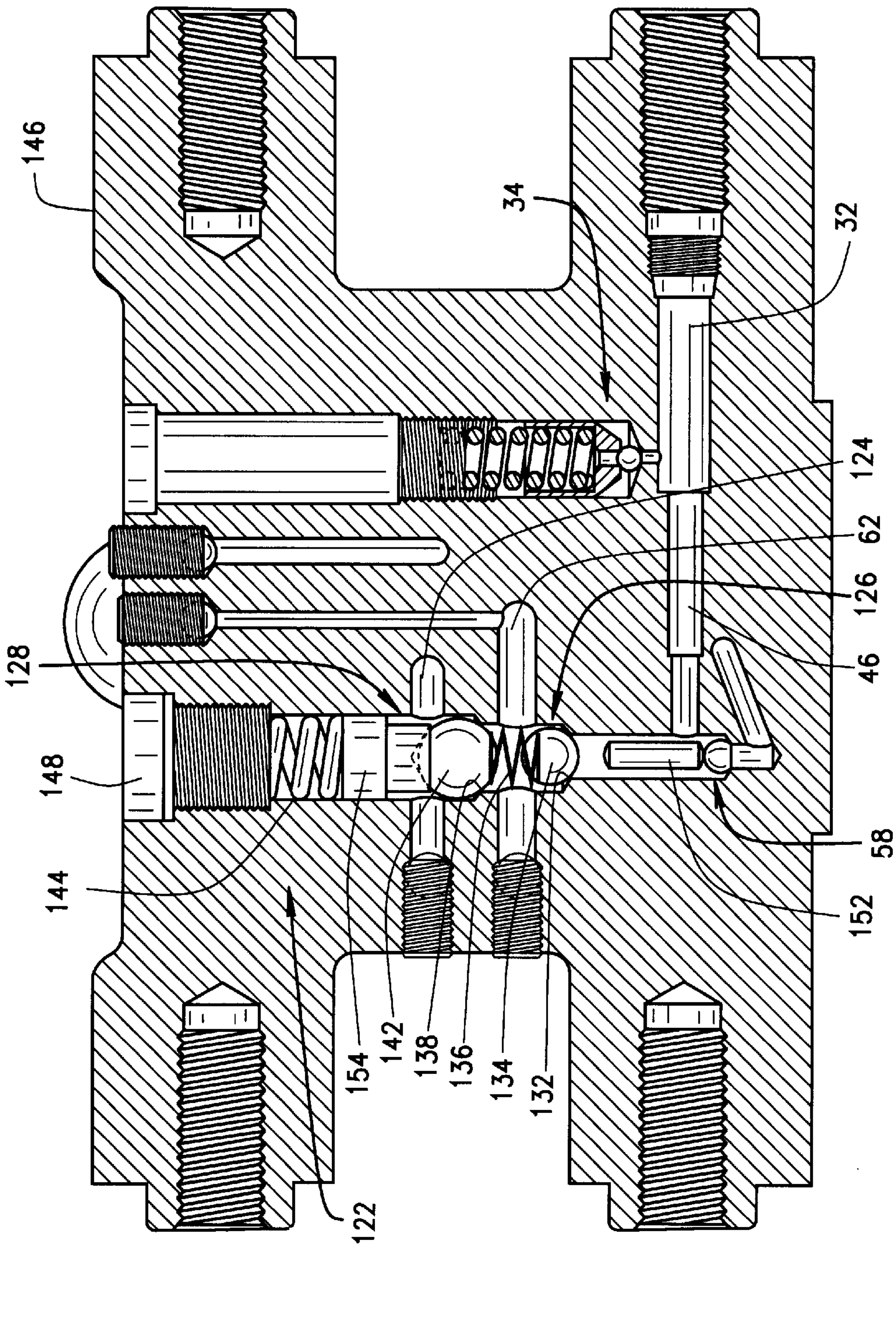
FIG. 5 is a cross-section view of a portion of the jack shown in FIG. 4 taken in the plane of line 5—5 of FIG. 4.

FIGS. 4 and 5 show cross-section views of the base 146 of the jack of the invention with FIG. 4 being a side cross-section of the base and FIG. 5 being a cross-section taken through the plane of line 5—5 shown in FIG. 4. Because the hydraulic fluid conduits and valve cavities are drilled into the base 146 of a jack in various different planes through the base, for simplicity only two cross-section views of the jack of the invention are shown in FIGS. 4 and 5, with FIG. 5 showing the multi-element valve housing 122 of the invention formed into the base 146 of the jack. It should be understood that the hydraulic circuit of the jack shown in FIGS. 4 and 5 is the same hydraulic circuit of the invention shown in the schematic representation of FIG. 3. Several of the hydraulic fluid conduits and the component parts of the jack shown in the schematic representation of FIG. 3 are also shown in FIGS. 4 and 5 with their same reference numerals.

As seen in FIG. 5, the multi-element valve housing 122 is machined into the base 146 with the pump suction valve 58, the first stage discharge valve element 134 and the second stage discharge valve element 142 in axial alignment in their respective cavities. It can be seen in FIG. 5 that as the cavities of the respective valve elements extend further into the base 146 from the exterior surface of the base, their cross-sectional areas become smaller. Thus, the three valve element cavities can be drilled into the base in coaxial alignment with a valve seat formed at the bottom of each cavity separating it from the next lower cavity as described earlier with reference to FIG. 3. A spacer 152 is positioned in the pump suction valve cavity limiting the movement of the pump suction valve 58 within the cavity. The first cavity valve seat 132 is machined into the base 146 just above the pump suction valve 58. The first stage discharge valve 134 rests on the first cavity valve seat 132 and the first stage spring 136 is positioned on the first stage valve. The first stage spring 136 extends upwardly from the first cavity 126 slightly beyond the second cavity valve seat 138 where it engages with the second stage discharge ball valve element 142. Because the first spring 136 engages against the second stage valve 142 to bias the first stage valve 134 against the first valve seat 132, there is no need to provide an annular shoulder or stop surface in the first cavity 126 for the first spring 136 to act against when biasing the first valve against the seat. The second stage discharge valve 142 is shown seated on the second cavity valve seat 138. A spacer 154 is positioned on top of the second stage valve element 142 and the second stage spring 144 is positioned between the spacer 154 and the screw threaded plug 148 that closes the valve housing 122 of the invention.

In operating the hydraulic circuit of the two stage lifting jack shown in FIGS. 3–5, the lever arm of the jack is first manually oscillated causing the plunger 26 of the pump to be retracted in the pump cylinder 24. This creates a vacuum in the pump cylinder that unseats the pump suction valve 58 and causes hydraulic fluid to be drawn from the reservoir R into the pump cylinder. On subsequent movement of the plunger 26 back into the cylinder 24 while manually oscillating the lever arm 12, the fluid in the pump cylinder is pressurized. As in the prior art hydraulic circuit, if pressure of the fluid in the pump cylinder become excessive, the relief ball valve 36 will unseat allowing the hydraulic fluid in the pump cylinder to pass through the relief valve 34 and return to the reservoir R. In normal operation, the fluid under pressure in the pump cylinder 24 travels through the first conduit 46 communicating the cylinder with the first stage discharge valve cavity 126. The pressure of the fluid cause the first stage discharge valve element 134 to be displaced from its valve seat 132 against the bias of the first spring 136. However, because the second spring 144 exerts a greater downward force on the second stage valve element 142 than the force exerted by the first spring 136, the second stage valve element 142 remains in place against its valve seat 138. The movement of the first stage valve element 134 away from its valve seat 132 allows the fluid under pressure to pass into the second conduit or downstream conduit 62.

The fluid in the downstream conduit 62 is directed by the hydraulic circuit to the release valve 64, the gravity valve 66 and into the ram conduit 88 and the interior bore or first chamber 86 of the lifting mechanism 74. As with the prior art two stage lifting jack, with no load applied to the lifting piston 94 of the jack, fluid pressure builds up quickly in the first chamber 96 of the piston and acts against the reaction surface 102 of the piston to cause the piston to be extended quickly from the lifting cylinder 92. As the piston is extended from the cylinder, the vacuum created in the second chamber 108 of the lifting cylinder causes the suction ball valve 116 to unseat from its valve seat against the bias of its spring 118 and draws hydraulic fluid from the reservoir R into the second chamber 108 behind the annular seal 106 of the lifting piston.

Once the lifting piston 94 reaches the object to be raised and a load is exerted on the piston, the force of hydraulic fluid pressure in the first chamber 96 acting on the first reaction surface 102 of the piston will eventually become insufficient to further extend the piston from the lifting cylinder 92 and lift the object. This causes the hydraulic fluid pressure in the second conduit 62 and in the ram conduit 88 to increase. As the pump 22 continues to force hydraulic fluid into the hydraulic circuit of FIG. 3, the increasing hydraulic fluid pressure developed by the pump eventually reaches the point where it displaces both the second stage discharge valve 142 and the first stage discharge valve 134 from their respective valve seats 138, 132, against the bias of the second stage spring 144. This allows the hydraulic fluid under the increased pressure to pass through both the first cavity 126 and the second cavity 128 to the third conduit 124 and through the third conduit to the second chamber 108 of the lifting mechanism 74. The increased pressure of the hydraulic fluid in the second chamber 108 acts against the larger surface area of the second reaction surface 112 of the piston 94. This results in a greater force exerted on the lifting piston by the hydraulic fluid in the second chamber 108 and the further extension of the lifting piston out of the cylinder, although now at a decreased rate.

Once the object has been lifted by the jack and it is desired to lower the object and retract the lifting piston 94 back into the lifting cylinder 92, the release valve 64 is opened by rotating the lever arm 12 of the jack in a counter-clockwise direction just as in the prior art hydraulic circuit.

Thus, the hydraulic circuit of the invention shown in FIGS. 3–5 provides a more simplified hydraulic circuit for a two stage, quick rising lifting jack. This is accomplished by machining the valve housing 122 of the invention into the base 146 of the jack with a pump suction valve cavity 58, a first stage discharge valve cavity 126 and a second stage discharge valve cavity 128 that are axially aligned and extensions of each other. This also positions the pump suction valve element, the first stage discharge valve element 134 and the second stage discharge valve element 142 in axial alignment with each other. The hydraulic circuit of the invention locates the drilling position for the pump suction valve, the first stage discharge valve and the second stage discharge valve at one location on the base 146 of the jack, thus eliminating multiple drilling locations in the jack for the multiple valve elements. The hydraulic circuit of the invention also locates the assembly point of the pump suction valve, the first stage discharge valve 134 and its associated spring 136, the second stage discharge valve 142 and its associated spring 144 and the sealing plug 148 at one location on the base 146 of the jack, thus eliminating multiple assembly locations on the base for multiple valves.

While the present invention has been described by reference to a specific embodiment, it should be understood that modifications and variations of the invention may be constructed without departing form the scope of the invention defined in the following claims.

What is claimed:

1. A lifting jack having a hydraulic circuit comprising:

a pump;

a lifting cylinder;

a lifting piston mounted in the lifting cylinder for reciprocating movement therein;

a plurality of fluid conduits communicating the pump with the lifting cylinder;

a valve housing interposed in the plurality of fluid conduits between the pump and the lifting cylinder, the valve housing having a first cavity containing a first spring biased valve element and a second cavity containing a second spring biased valve element, and the first and second cavities are extensions of each other.

2. A lifting jack having a hydraulic circuit comprising:

a pump;

a lifting cylinder;

a lifting piston mounted in the lifting cylinder for reciprocating movement therein;

a plurality of fluid conduits communicating the pump with the lifting cylinder;

a valve housing interposed in the plurality of fluid conduits between the pump and the lifting cylinder, the valve housing having a first cavity containing a first spring biased valve element and a second cavity containing a second spring biased valve element, the first and second cavities are extensions of each other; and the first cavity has a center axis and the second cavity has a center axis and the first and second cavities are coaxial.

3. The lifting jack hydraulic circuit of claim 1, wherein:

the plurality of fluid conduits includes a first conduit that extends between the pump and the first cavity of the valve housing, and the second cavity of the valve housing communicates directly through the first cavity and the first fluid conduit with the pump.

4. The lifting jack hydraulic circuit of claim 1, wherein:

the plurality of fluid conduits includes a second fluid conduit that extends between the first cavity of the valve housing and the lifting cylinder and a third fluid conduit that extends between the second cavity of the valve housing and the lifting cylinder.

5. The lifting jack hydraulic circuit of claim 4, wherein:

the second and third fluid conduits are independent of each other.

6. The lifting jack hydraulic circuit of claim 4, wherein:

the lifting cylinder contains a first chamber and a second chamber, the first and second chambers are sealed separate from each other, and the second conduit extends between the first cavity of the valve housing and the first chamber of the lifting cylinder and the third conduit extends between the second cavity of the valve housing and the second chamber of the lifting cylinder.

7. The lifting jack hydraulic circuit of claim 6, wherein:

the lifting piston is mounted in the lifting cylinder for reciprocating movement between extended and retracted positions of the lifting piston relative to the lifting cylinder, the lifting piston has a first surface in the first chamber of the lifting cylinder and a second surface in the second chamber of the lifting cylinder, the first surface of the lifting piston is exposed to a pressure of fluid pumped from the pump through the first conduit, the first cavity and the second conduit to the first chamber of the lifting cylinder and the second surface of the lifting piston is exposed to a pressure of fluid pumped from the pump through the first conduit, the first cavity, the second cavity and the third conduit to the second chamber of the lifting cylinder.

8. The lifting jack hydraulic circuit of claim 7, wherein:

the second surface of the lifting cylinder has a greater surface area than the first surface of the lifting cylinder.

9. The lifting jack hydraulic circuit of claim 1, wherein:

a spring is contained inside the first cavity of the valve housing and is positioned between the first and second valve elements.

10. The lifting jack hydraulic circuit of claim 1, wherein:

a first valve seat is contained in the first cavity and the first valve element is biased against the first valve seat to close communication between the first cavity and the pump, and a second valve seat is contained in the second cavity and the second valve element is biased against the second valve seat to close communication between the second cavity and the first cavity, and the second valve seat is positioned between the first and second cavities in the valve housing.

11. The lifting jack hydraulic circuit of claim 10, wherein:

the first valve element and the second valve element are both ball valves and the first valve element is smaller than the second valve element.

12. The lifting jack hydraulic circuit of claim 10, wherein:

the first valve seat and the second valve seat are both circular and have center axes that are coaxial.

13. The lifting jack hydraulic circuit of claim 1, wherein:

the valve housing is contained inside a base of the lifting jack and the first and second cavities of the valve housing are both accessible from outside the base through an opening in the base that is closed by a removable plug.

14. The lifting jack hydraulic circuit of claim 13, wherein:

a first spring is positioned between the first valve element and the second valve element in the first cavity of the valve housing and a second spring is positioned between the second valve element and the removable plug in the second cavity of the valve housing.

15. A lifting jack having a hydraulic circuit comprising:

a pump;

a lifting cylinder;

a lifting piston mounted in the lifting cylinder for reciprocating movement therein;

a plurality of fluid conduits communicating the pump with the lifting cylinder;

a first valve element and a second valve element interposed in the plurality of fluid conduits between the pump and the lifting cylinder; and a spring between the first and second valve elements biasing the first and second valve elements away from each other.

16. The lifting jack hydraulic circuit of claim 15, wherein:

the spring is in engagement with both the first and second valve elements.

17. The lifting jack hydraulic circuit of claim 16, wherein:

the first valve element and the second valve element are both ball valves having center axes that are coaxial with each other.

18. The lifting jack hydraulic circuit of claim 15, wherein:

the first valve element is contained inside a first cavity of a valve housing and the second valve element is contained inside a second cavity of a valve housing and the first and second cavities are extensions of each other.

19. A lifting jack having a hydraulic jack having a hydraulic circuit comprising:

a pump;

a lifting cylinder;

a lifting piston mounted in the lifting cylinder for reciprocating movement therein;

a plurality of fluid conduits communicating the pump with the lifting cylinder;

a first valve element and a second valve element interposed in the plurality of fluid conduits between the pump and the lifting cylinder;

a spring between the first and second valve elements biasing the first and second valve elements away from each other;

the first valve element is contained inside a first cavity of a valve housing and the second valve element is contained inside a second cavity of a valve housing and the first and second cavities are extensions of each other; and the valve housing is contained inside a base of the lifting jack and the first and second cavities of the valve housing are both accessible from outside the base through an opening in the base that is closed by a removable plug.

20. The lifting jack hydraulic circuit of claim 19, wherein:

a second spring is positioned between the second valve element and the removable plug in the second cavity of the valve body.

* * * * *